(12) United States Patent  (10) Patent No.: US 7,628,440 B2
Bernhardsson et al.  (45) Date of Patent: Dec. 8, 2009

(54) CARGO SPACE ARRANGEMENT

(75) Inventors: Nils Bernhardsson, Torslanda (SE);
Kenneth Laine, Hisings Kärra (SE);
Kent Sandstrom, Landvetter (SE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/968,895

(22) Filed: Jan. 3, 2008

(65) Prior Publication Data

US 2008/0164709 A1  Jul. 10, 2008

(30) Foreign Application Priority Data

Jan. 5, 2007  (EP) .................................. 07100144

(51) Int. Cl.
*B60R 7/02*  (2006.01)
(52) U.S. Cl. ................. 296/37.14; 296/37.16; 296/37.2
(58) Field of Classification Search ............... 296/37.2, 296/37.14, 37.16; 217/60 E; 16/291, 400; 220/830, 827
See application file for complete search history.

(56) References Cited

U.S. PATENT DOCUMENTS

| 829,385 A * | 8/1906 | Brennan, Jr. ............... 217/60 E |
| 4,148,516 A | 4/1979 | Gotomyo |
| 5,037,154 A | 8/1991 | Senba et al. |
| 5,441,183 A | 8/1995 | Frenzel |
| 5,799,845 A * | 9/1998 | Matsushita ............... 224/42.14 |
| 6,065,794 A | 5/2000 | Schlachter |
| 6,155,625 A * | 12/2000 | Felix ........................ 296/37.14 |
| 6,467,829 B2 * | 10/2002 | Kaluszka et al. ........... 296/37.3 |
| 6,582,006 B1 * | 6/2003 | Burch .................... 296/100.06 |
| 6,890,015 B2 * | 5/2005 | Carlsson et al. .......... 296/37.14 |
| 7,017,980 B1 * | 3/2006 | Bejin et al. ............ 296/193.07 |
| 7,374,221 B2 * | 5/2008 | McClure et al. ............ 296/37.6 |
| 2003/0116989 A1 * | 6/2003 | Guanzon et al. ......... 296/37.16 |
| 2008/0100082 A1 * | 5/2008 | Heo ........................ 296/37.16 |

FOREIGN PATENT DOCUMENTS

| EP | 1068996 | 1/2001 |
| EP | 0927663 | 9/2002 |
| WO | WO 98/23465 | 6/1998 |

* cited by examiner

*Primary Examiner*—Jason S Morrow
(74) *Attorney, Agent, or Firm*—Gregory Brown; Brooks Kushman P.C.

(57) ABSTRACT

A cargo space arrangement for a vehicle comprising a main cargo space positioned inside a vehicle door, a load floor forming a lower area of the main cargo space, and a floor lid arranged in the load floor. The floor lid being arranged to conceal a storage compartment located below the floor lid. The floor lid comprises a first, upwardly openable end that faces the vehicle door and a second, opposite end that, at least when the floor lid is in a closed position, is firmly attached to the vehicle. The first end of the floor lid extends below at least a part of the vehicle door when both the floor lid and the vehicle door are in a closed position such that the floor lid is prevented from being opened when the vehicle door is closed.

5 Claims, 4 Drawing Sheets

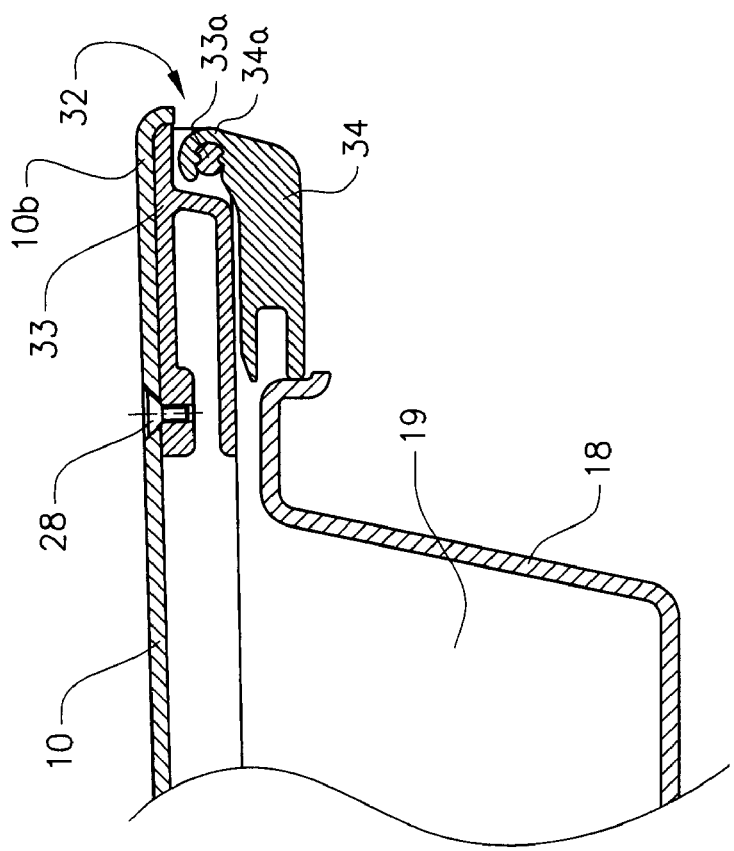
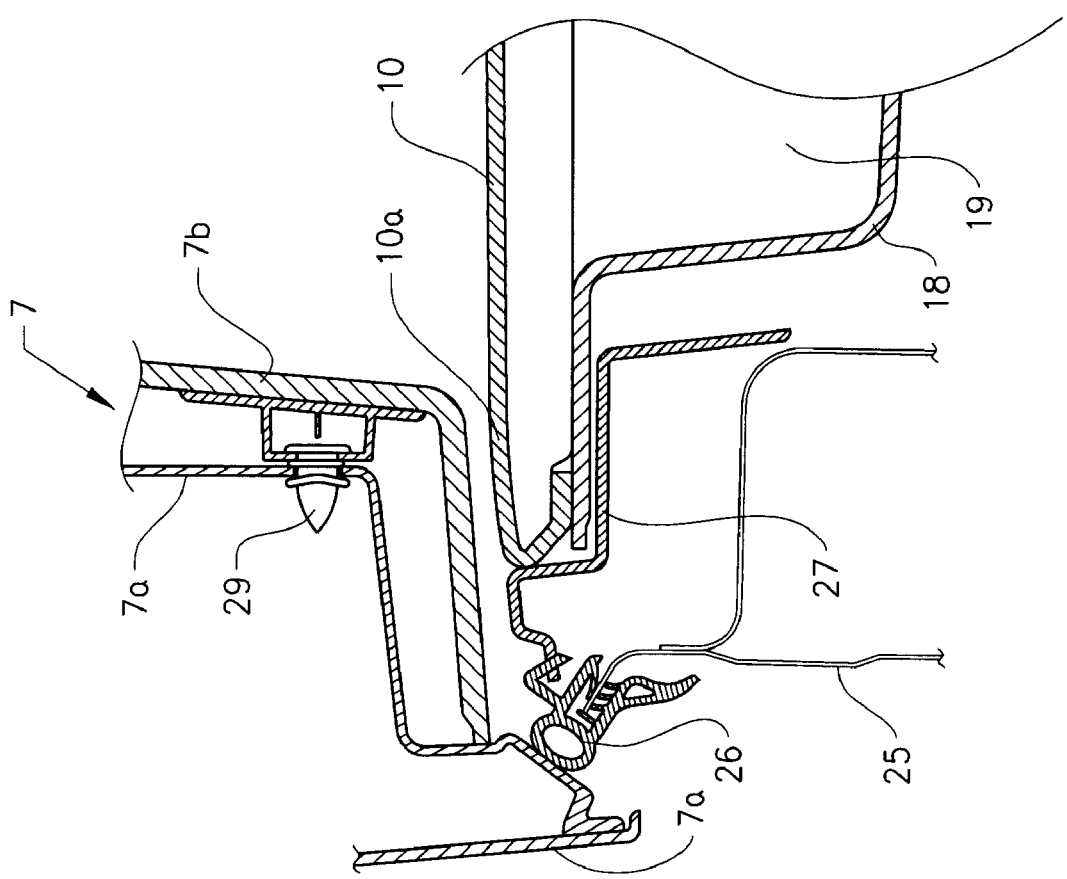
FIG. 3
FIG. 4

CARGO SPACE ARRANGEMENT

FIELD OF INVENTION

This invention relates to a cargo space arrangement for a vehicle. In particular, the invention relates to a storage compartment below a load floor lid of station wagons and the like.

BACKGROUND

Most passenger cars are provided with a locking system that prevents access to a particular storing compartment of the car. Traditionally, the means provided for this purpose has been a glove compartment lockable by an ordinary key that may or may not be handed out to someone who is to borrow or park the car.

Modern cars make use of electronic locking systems, including remote controls, which have made it possible to provide cars with a locking system that can prevent access to the luggage boot even if the main key, i.e. the remote control, is handed out. By setting the electronic locking system in a certain mode, sometimes called "Private locking" or "Secrecy mode", only the side doors can be unlocked by the remote control. One example of how to set the system in this mode is to provide the remote control with a releasable metal key that activates the secrecy mode when used to lock the glove compartment. By also locking the rear seats when the secrecy mode is activated, access is denied to the luggage boot to a person using the car, e.g. a person parking the car at fashionable hotels or restaurants ("Valet parking").

For station wagons, vans and similar vehicles, the above described electronic secrecy system is not applicable since access to the cargo space at the rear of the vehicle is possible also from the inside of the vehicle.

A way of preventing access to a part of the cargo space is proposed in U.S. Pat. No. 5,441,183 which discloses a "compartmentalizer unit" in the form of a box with a hinged lid forming part of the upper, horizontal side of the box. The unit is intended to fit into a lower part of the cargo space of a station wagon and to be easily installed in and removed from the cargo space. Provided that the walls and doors defining the cargo space are suitably sloped upwardly and inwardly, the lid can not be raised and the unit can not be tilted to gain access to items stored in the box when the both the lid and the backdoor or tailgate of the vehicle are closed. Drawbacks of such a unit are that it prevents access to storage compartments located below the load floor and that it takes up a great deal of space and thus limits the space available for the cargo. Although the compartmentalizer unit may be removed from the cargo space, it becomes troublesome to alternately install and remove the unit when access to lower storage compartments is needed or when different types of cargo are to be transported. In addition, the proposed unit is difficult to apply to vehicles where the walls and doors do not slope in a suitable way.

Another variant is shown in U.S. Pat. No. 5,037,154, which discloses a lockable package tray installed within the luggage compartment to conceal luggage placed below. A drawback of such a package tray is that it, in similarity with U.S. Pat. No. 5,441,183, takes up a great deal of space.

SUMMARY

An object of this invention is to provide a cargo space arrangement for vehicles, in particular station wagons, vans and similar passenger vehicles, that enables "private locking" of a storage compartment also for such vehicles, and that eliminates or reduces the above mentioned drawbacks of the known systems. This object is achieved by the arrangement defined by the technical features contained in independent claim 1. The dependent claims contain advantageous embodiments, further developments and variants of the invention.

The invention concerns a cargo space arrangement for a vehicle, said cargo space arrangement comprising a main cargo space positioned inside a vehicle door, a load floor forming a lower area of the main cargo space, and a floor lid arranged in the load floor, said floor lid being arranged to conceal a storage compartment located below the floor lid, wherein the floor lid comprises a first, upwardly openable end that faces the vehicle door and a second, opposite end that, at least when the floor lid is in a closed position, is firmly attached to the vehicle.

In the inventive arrangement, the first end of the floor lid extends below at least a part of the vehicle door when both the floor lid and the vehicle door is in a closed position such that the floor lid is prevented from being opened when the vehicle door is closed. In other words, the vehicle door overlaps the lid when both the lid and the door are in their closed positions such that it becomes impossible, or at least very difficult, to open the lid if the particular vehicle door is not properly opened.

Such a design has several advantageous effects. Firstly, it provides a storage compartment that is difficult to get access to when the vehicle is locked. A direct effect of this is that thefts of the "smash-and-grab" type of items stored in the storage compartment are prevented. Secondly, it makes it possible to provide a private storage compartment also in station wagons, vans and similar vehicles. By setting a locking system in "Private locking mode" or "Secrecy mode", i.e. in a mode where the vehicle door (e.g. a tailgate) that prevents the floor lid from being opened can not be unlocked or opened by using the remote control, access is denied to the compartments located below the floor lid. Thirdly, in contrast to arrangements such as those disclosed in e.g. U.S. Pat. No. 5,037,154 and U.S. Pat. No. 5,441,183 where access to the "private compartment" is possible if the (rear) seats are let down to a lower position, the inventive cargo space arrangement does not require the (rear) seats of the vehicle to be locked in their upright position. A fourth advantageous effect is that the inventive arrangement does not occupy any space in the main cargo space, i.e. it does not reduce the volume of the cargo space. A fifth advantageous effect is that the inventive arrangement provides a storing compartment which is protected by a load floor lid that of necessity must exhibit a considerable structural strength and that can be fitted very tightly in the load floor. Such a storing compartment is much more difficult to force open than e.g. the box disclosed in U.S. Pat. No. 5,441,183 where it is likely that there will be a play, sufficient for inserting a screwdriver into, between the lid and the sloping walls, in particular because such walls normally are covered with a resilient inner panel.

A further advantage of the inventive cargo space arrangement is that it requires a minimum of additional components that would increase the weight and/or cost. Such additional components are, for instance, needed in an alternative solution where a conventional load floor lid, i.e. a lid that does not extend below a closed vehicle door, is provided with a mechanical or electronic lock.

The invention also concerns a vehicle comprising a cargo space arrangement of the above type.

BRIEF DESCRIPTION OF DRAWINGS

In the description of the invention given below reference is made to the following figure, in which:

FIG. 3 shows, in a sectional side view, a rear part of the embodiment according to FIG. 1, FIG. 4 shows, in a sectional side view, a front part of the embodiment according to FIG. 1.

DETAILED DESCRIPTION

Figure 1:
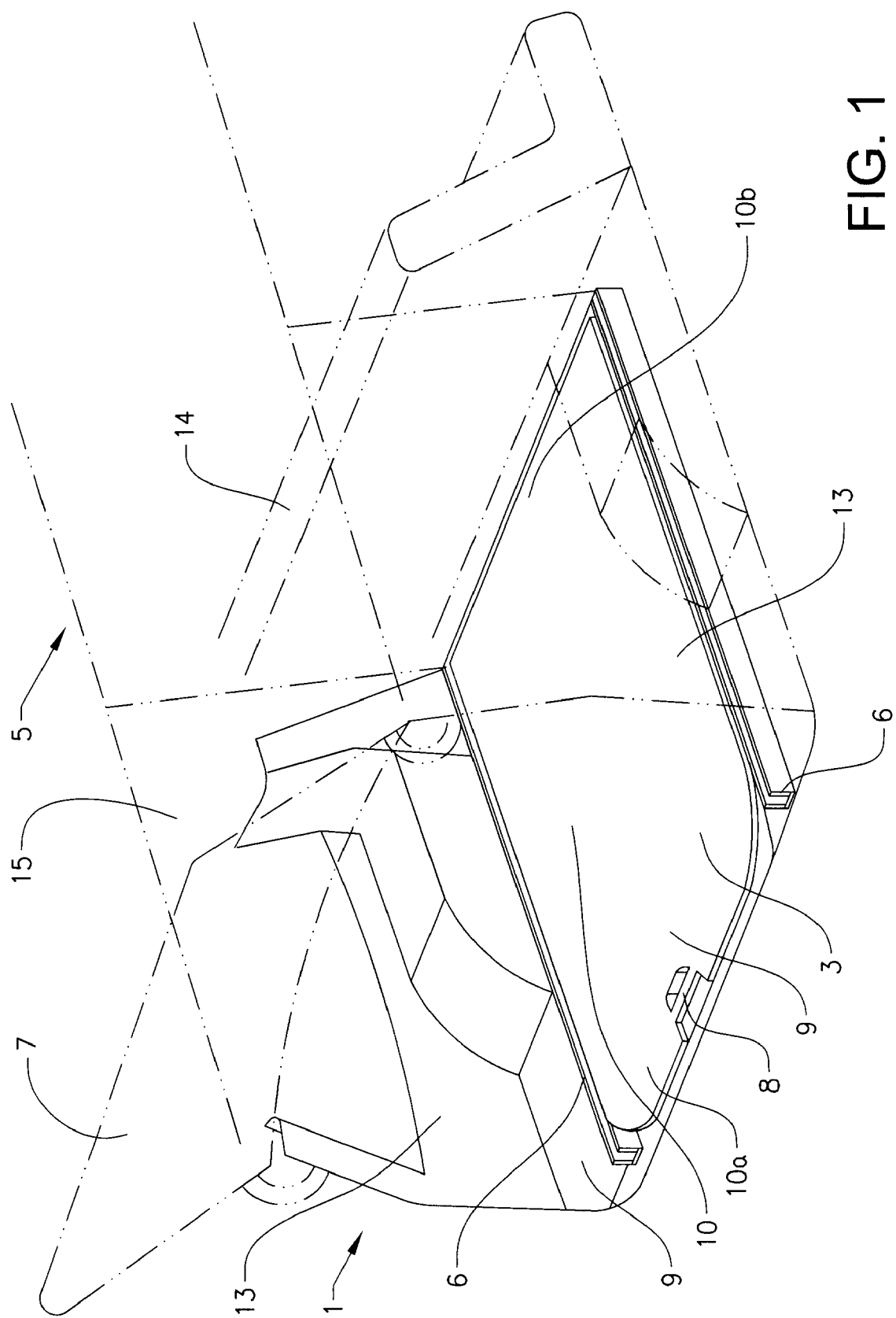
FIG. 1 shows, in a perspective and schematic view, a preferred embodiment of a cargo space arrangement according to the invention.

FIG. 1 shows a preferred embodiment of an inventive cargo space arrangement 1 that is arranged in a (schematically and partly shown) vehicle in the form of a station wagon. The cargo space arrangement 1 is positioned immediately inside a tailgate 7 of the vehicle and comprises a main cargo space 3, a load floor 9 provided with a load floor lid 10 that, in this case, forms a major part of the load floor 9. The load floor 9 continues in the same plane on both sides of the lid 10, i.e. on the left and right side of the lid with reference to the vehicle 5. Load rails 6 are arranged along the sides of the lid 10.

Figure 5:
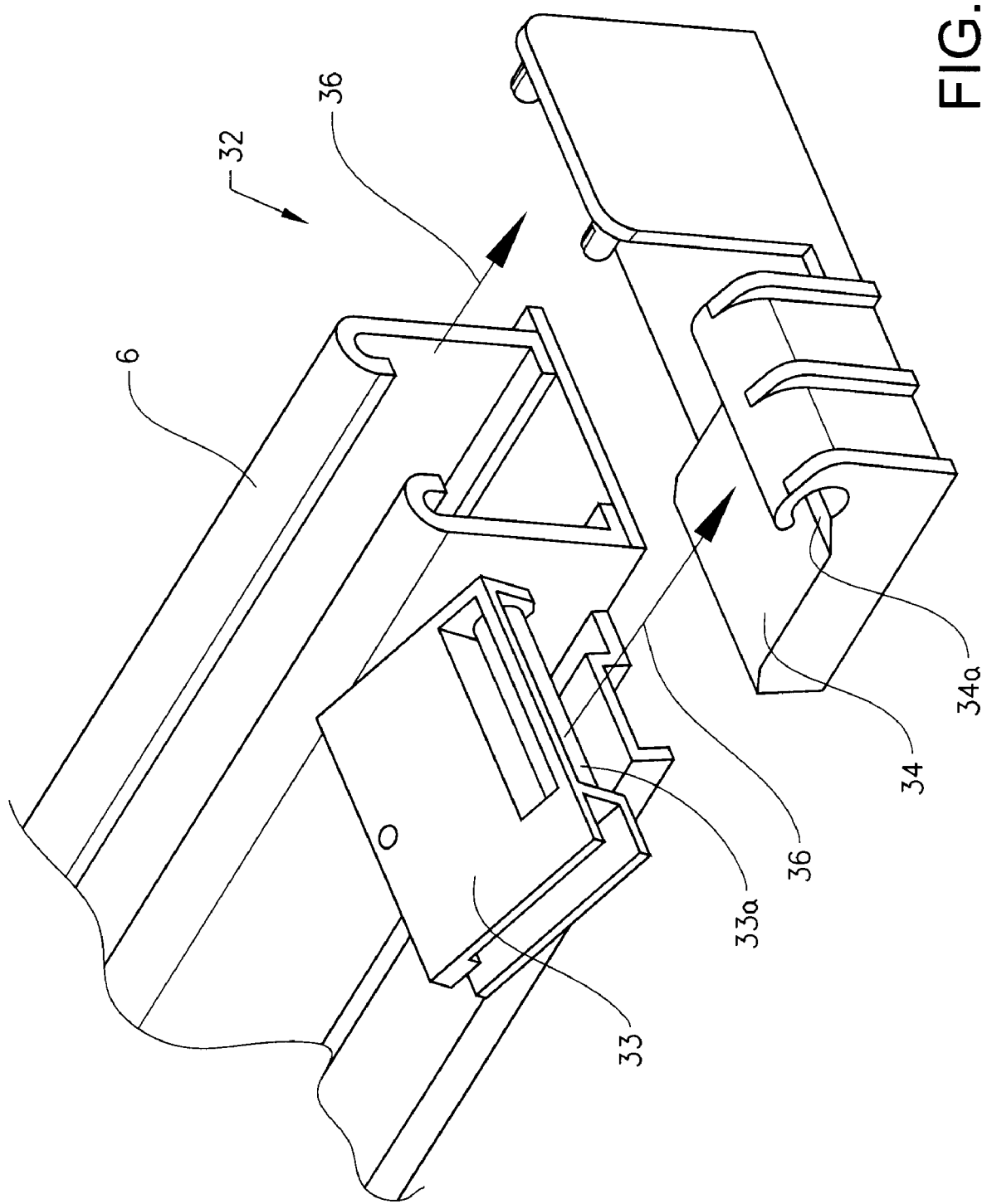
FIG. 5 shows details of the embodiment according to FIG. 1.

The lid 10 has a first, upwardly openable end 10a that faces the tailgate 7, i.e. that is oriented towards the rear of the vehicle 5, and a second, opposite end 10b, that thus is oriented in a forward direction of the vehicle 5, which second end 10b is pivotally attached to the vehicle 5 by means of a hinge arrangement 32 (shown in FIGS. 4 and 5). A handle 8 for lifting the lid 10 is arranged at the first end 10a of the lid 10. The main cargo space 3 is defined by walls 13 at the sides, by a passenger seat 14 in a forward direction, by the tailgate 7 (when closed) in a rear direction, by the load floor 9 (including the lid 10) in a down direction, and by a roof 15 in an upward direction. In FIG. 1 the floor lid 10 is in a closed position, whereas the tailgate 7 is in an open position.

As is described in more detail below in relation to FIG. 3, the first end 10a of the lid 10 extends below the tailgate 7 when both the lid 10 and the tailgate 7 are in their closed positions. In other words, the tailgate 7 overlaps the lid 10 when both the lid 10 and the tailgate 7 are in their closed positions. The effect of this arrangement is that the tailgate 7 prevents the lid 10 from being opened when the tailgate 7 is closed.

The term tailgate refers to a door positioned at the back of a regular station wagon, i.e. the tailgate is hinged at its top portion such as to pivot around a horizontal axis (in contrast to regular vehicle side doors that pivot around a vertical axis).

Figure 2:
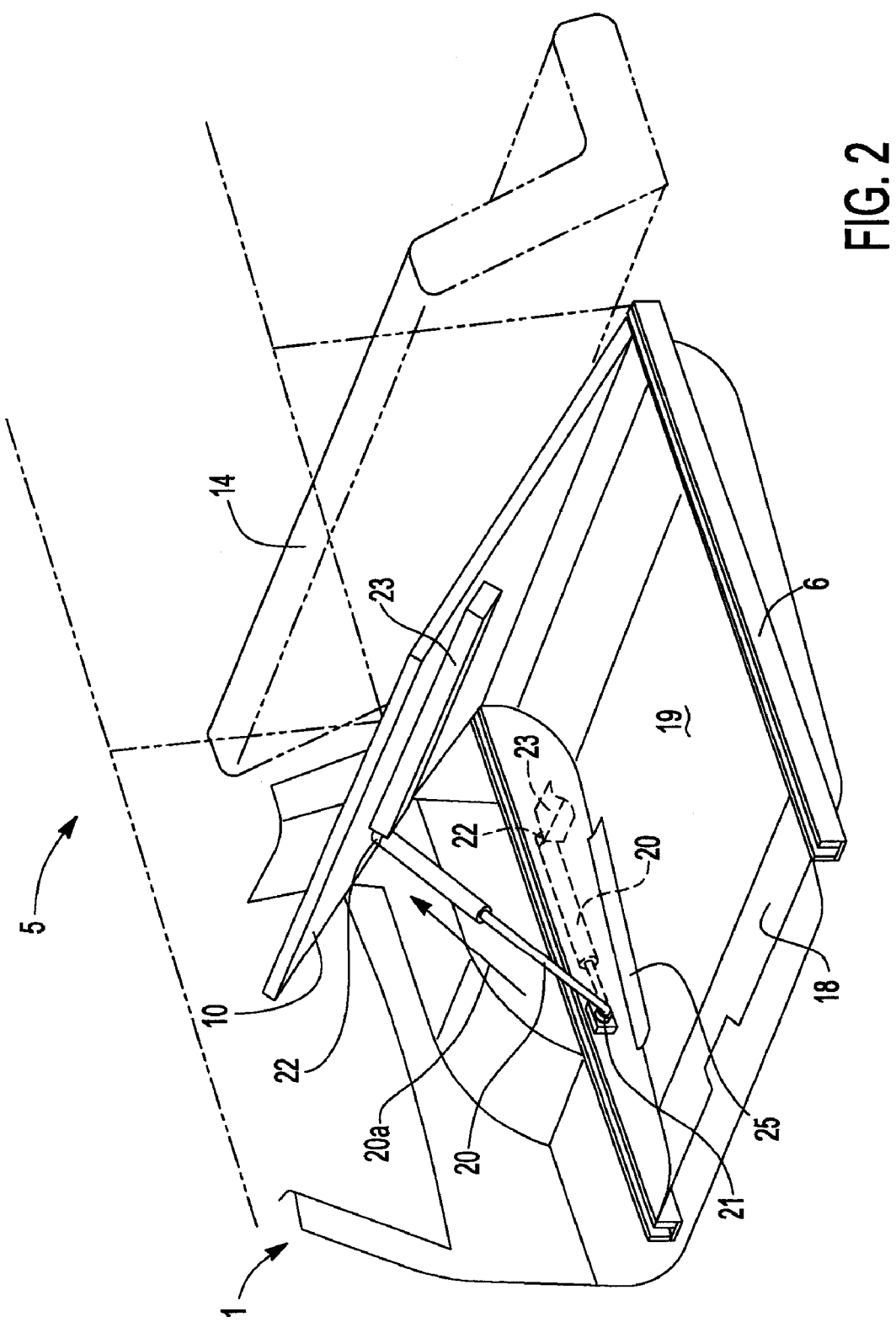
FIG. 2 shows, in a perspective and schematic view, the embodiment according to FIG. 1, with the floor lid in an open position.

FIG. 2 shows the cargo space arrangement 1 according to FIG. 1 but with the floor lid 10 in an open position. For illustration purposes, the tailgate 7 and part of the load floor 9 and the vehicle 5 are not shown in FIG. 2. As can be seen in FIG. 2, a storage tray 18 is positioned below the floor lid 10. The storage tray 18 comprises a storage compartment 19 in which various items can be stored. Thus, when the load floor lid 10 is in a closed position it conceals the storage compartment 19 located below the load floor 9. The storage tray 18 is openable in a similar manner as the floor lid 10 which allows access to further storage compartments (not shown) located below the storage tray 18. The storage compartment 19 may of course be divided up such as to form a plurality of smaller storage compartments.

A gas spring 20 is connected, by means of first and second ball joints 21, 22, between the floor lid 10 and one of the load rails 6 in order to facilitate opening and closing of the floor lid 10. The load rail 6 is in turn firmly attached to a body structure (not shown in FIG. 2) of the vehicle. The second ball joint 22 connecting the gas spring 20 to the floor lid 10 is attached to a reinforcement member 23 of the lid 10. When compressed, the gas spring 10 generates a push force in a direction indicated with arrow 20a.

The gas spring 20 is shown diagrammatically in phantom lines FIG 2. The gas spring 20 is arranged such that, when the floor lid 10 is closed, the second ball joint 22 (at the floor lid 10) is located slightly further away, in a vertical direction, from the floor lid 10 than the first ball joint 21 at the load rail 6. This way the gas spring 10 is not compressed at its maximum when the lid 10 is closed, instead it becomes compressed at its maximum when the lid 10 is positioned in a slightly open position. Thereby the gas spring 20 facilitates both closing and opening of the floor lid 10. In contrast to conventional cargo space arrangements, the tailgate 7 can not be closed if the floor lid 10 is slightly open. It is therefore an additional advantage of having means that facilitates proper closing of the floor lid 10.

A slit 25 is arranged in the storage tray 18 to prevent that the gas spring 20 interferes with the storage tray 18 when the storage tray 18 is opened.

FIG. 3 shows a cross-sectional, side view of a rear portion of the cargo space arrangement 1 in a situation where the tailgate 7 is closed. Both the storage tray 18 and the floor lid 10 rest, when closed, on a sill moulding 27 positioned below the closed tailgate 7. FIG. 3 clearly shows that the first end 10a of the lid 10 extends below the tailgate 7 when both the lid 10 and the tailgate 7 are in their closed positions. FIG. 3 also clearly shows that the first end 10a of the lid 10 extends not only below a trim 7b (i.e. an inner panel) of the tailgate 7, but also below a structural part 7a of the tailgate 7. Hence, opening of the lid 10 is not possible when the tailgate 10 is closed.

Depending on the tailgate design, it can be sufficient if the floor lid 10 extends below only the tailgate trim 7b. It is also possible to provide the vehicle door 7 with a special part that becomes positioned above, e.g. by interlocking with the lid 10, when the lid 10 and the vehicle door 7 both are closed. In such a case, the first end 10a of the floor lid 10 extends below a (special) part of the vehicle door 7.

FIG. 3 also shows a part of the body structure 25 of the vehicle, a tailgate sealing 26 and a clip 29 fixing the tailgate trim 7b to the structural part 7a of the tailgate 7.

FIG. 4 shows a cross-sectional, side view of a front portion of the cargo space arrangement 1. The hinge arrangement 32 comprises an upper hinge part 33 fastened, in this example by screws 28, to the floor lid 10 and a lower hinge part 34 fastened to the body structure (not shown in FIG. 4) of the vehicle 5, in this example via the load rails 6 to which the lower hinge part 34 is fastened by snap locking. The screw 28 exemplified in FIG. 4 is only for illustrating purposes; to avoid inadmissible opening of the floor lid, the screw should preferably be arranged such as to prevent access from an upper side of the floor lid 10, e.g. by fastening the screw 28 from the underside of the floor lid 10. When installed in the vehicle 5, the lower hinge part 34 is prevented from being detached from the load rail 6 by means of a blocking member (not shown).

The upper hinge part 33 comprises an axis 33a and the lower hinge part 34 comprises a recess 34a adapted to receive said axis 33a. The hinge arrangement 32 provides a firm attachment of the second, forward end 10b of the floor lid 10 that makes it difficult to force the lid 10 open, even when using e.g. a screwdriver, when the tailgate 7 is closed.

FIG. 5 shows a perspective view of the upper hinge part 33, the lower hinge part 34 and a part of the load rail 6. Arrows 36 indicate how the different parts are to be put together.

An alternative way of preventing the lower hinge part 34 from being detached is to arrange the lower hinge part 34 such as to be snap-locked to the rail 6 in a transverse direction in relation to the longitudinal direction of the rail 6.

As can be seen in FIGS. 4 and 5 the floor lid 10 is installed by sliding it forward until the axis 33a comes in place in the recess 34a. This allows for an easy and cost-effective installation of the floor lid 10.

The floor lid 10 may comprise further reinforcement members and exhibits preferably a considerable structural strength and rigidity, both with regard to carrying load and to resistance towards inadmissible opening attempts.

The vehicle cargo space arrangement 1 described above provides a storing compartment, i.e. the storage compartment 19, that is difficult to get access to when the vehicle is locked. Thefts of the "smash-and-grab" type of items stored in the storage compartment 19 are thereby prevented.

The vehicle cargo space arrangement 1 described above also makes it possible to provide a private storage compartment, i.e. the storage compartment 19, also in station wagons, vans and similar vehicles. By setting a locking system in "Private locking mode" or "Secrecy mode", i.e. in a mode where the tailgate 7 (or other vehicle door preventing the floor lid 10 from being opened) can not be unlocked by the remote control or main key, access to the compartments below the floor lid 10 can thus denied. An electronic locking system may be set in this mode by providing the remote control with a releasable metal key that activates the secrecy mode when used to lock the glove compartment.

The invention is not limited by the embodiments described above but can be modified in various ways within the scope of the claims. For instance, it is not necessary that the vehicle door is a tailgate of a station wagon. Alternatively, it could be side-hinged back door or a rear side door, such as a (slidable) side door of a van, that overlaps the floor lid 10 when closed such as to prevent the floor lid 10 from being opened. Although the inventive cargo space arrangement is primarily intended for a station wagon and the like, the invention can be applied also to other vehicles, such as sedans equipped with vehicle doors in the form of side doors and luggage boot lids.

Moreover, it is not necessary that the main cargo space 3 has a roof.

Attachment of the second end 10b of the floor lid 10 to the vehicle can be carried out in various ways. Besides using hinge arrangements for pivotal attachment, it could e.g. be arranged simply by inserting the floor lid 10, or a part thereof, below a fixed part of the load floor 9. What is important is that the attachment has a sufficient structural strength so that inadmissible opening of the lid 10 becomes difficult.

As an alternative to what is described in relation to the hinge arrangement 32, it is possible to instead provide the lower hinge part 33 with the axis 33a and the upper hinge part 34 with the recess 34a.

Further, the load rails are not necessary for the invention; conventional load floor supports can be used instead.

What is claimed is:

1. Cargo space arrangement for a vehicle, said cargo space arrangement comprising:
    a main cargo space positioned inside a vehicle door;
    a load floor forming a lower area of the main cargo space,
    a floor lid arranged in the load floor, said floor lid being arranged to conceal a storage compartment located below the floor lid, wherein the floor lid comprises a first, upwardly openable end that faces the vehicle door and a second, opposite end that, at least when the floor lid is in a closed position, is firmly attached to the vehicle, and
    a gas spring having one end, via a first joint, attached to a load rail disposed along one side and positioned below the floor lid and another end, via a second joint, attached to a reinforcement member of the floor lid such as to facilitate opening and closing of the floor lid, wherein the gas spring is arranged such that, when the floor lid is closed, the second joint is located further away, seen in a vertical direction, from the floor lid than the first joint.

2. The cargo space arrangement as claimed in claim 1 wherein the floor lid, when closed, forms at least a part of the load floor.

3. The cargo space arrangement as claimed in claim 1 wherein the second end of the floor lid is attached directly or indirectly to a body structure of the vehicle via a hinge arrangement.

4. The cargo space arrangement as claimed in claim 3 wherein the hinge arrangement comprises an upper hinge part fastened to the floor lid and a lower hinge part fastened to the body structure of the vehicle , wherein one of the hinge parts comprises an axis and the other hinge part comprises a recess adapted to receive said axis.

5. The cargo space arrangement as claimed in claim 1 wherein the vehicle door is a tailgate.

\* \* \* \* \*